Jan. 12, 1965 W. A. WOOTTEN 3,165,594

METHOD OF AND APPARATUS FOR TRANSPORTING LINEAR ELEMENTS

Filed June 2, 1961 2 Sheets-Sheet 1

INVENTOR.
WILLIAM A. WOOTTEN
BY Lilly & Nyhagen
ATTORNEYS

METHOD OF AND APPARATUS FOR TRANSPORTING LINEAR ELEMENTS

Filed June 2, 1961 2 Sheets-Sheet 2

INVENTOR.
WILLIAM A. WOOTTEN
BY Lilly & Nyhagen
ATTORNEYS

United States Patent Office 3,165,594
Patented Jan. 12, 1965

3,165,594
METHOD OF AND APPARATUS FOR TRANSPORTING LINEAR ELEMENTS

William A. Wootten, 1324 Palos Verdes Drive W., Palos Verdes Estates, Calif.

Filed June 2, 1961, Ser. No. 114,544
18 Claims. (Cl. 179—100.2)

This invention relates generally to a transport mechanism for feeding tape, wire, and other similar materials along a given path of movement and, particularly, to a new and unique hydraulic transport mechanism of this type.

One of the primary applications of the present transport mechanism concerns itself with feeding a magnetic recording tape past a magnetic sound head in order to either magnetically record an electrical signal on the tape or reproduce a previously recorded signal. In existing magnetic tape recorders and reproducers, the magnetic tape is fed past the magnetic sound head by a tape transport mechanism including such items as supply and take-up reels, a friction drive roller, a speed governor, and a complex geared motor drive. It is evident that these tape transports are very complex, require a great number of precision parts, are costly to manufacture and assemble, are prone to damage by shock as well as other mal-operation, and are difficult and costly to service.

The present invention provides a unique hydraulic magnetic tape transport for use in a magnetic tape recorder which is very simple in construction, economical to manufacture, and possesses many other highly desirable features which will become evident as the description proceeds. Magnetic recording wire as well as magnetic recording tape can be fed by the present transport mechanism.

The magnetic recorder application mentioned above is only one of the many uses of the present hydraulic transport mechanism. For example, the transport mechanism can be adapted for use as an electrical switching device, a variable resistor, a prime mover, and a photoelectric signal reproducer. In each of these several applications, the unique hydraulic transport concept of the present invention plays an essential part in rendering those applications practical and ideally suited to their respective purposes.

With the foregoing preliminary discussion in mind, a general object of this invention may be stated as being the provision of a new and unique hydraulic transport mechanism for tape, wire, and the like and a new and unique method of feeding such materials along a path of movement.

A more specific object of the invention is to provide a transport mechanism and method of the character described in which the driven tape or wire is moved by the pressure of hydraulic fluid.

Another object of the invention is to provide a hydraulic transport mechanism of the character described which has a wide range of uses.

Yet another object of the invention is to provide a new and unique hydraulically driven magnetic recorder and reproducer.

A further object of the invention is to provide a magnetic recorder and reproducer as in the foregoing object in which the magnetic recording medium can be handled in cartridge form so as to permit one magnetic tape to be removed from and a new magnetic tape to be placed on a recorder-reproducer with the same facility and ease as placing a conventional phonograph record on a record player.

A further object of the invention is to provide a unique hydraulically powered programing switch.

A further object of the invention is to provide a unique hydraulically powered variable resistor.

A further object of the invention is to provide a unique hydraulically powered prime mover.

A further object of the invention is to provide a unique hydraulically powered photoelectric signal reproducer.

A further object of the invention is to provide a hydraulic transport mechanism of the character described which is extremely simple in construction, requires very few precision parts, is economical to manufacture, immune to malfunctioning, hermetically sealed so as to be completely dust-proof, and is otherwise ideally suited to its intended purposes.

The invention will now be described in greater detail by reference to the attached drawings, wherein.

The magnetic recorder-reproducer 10 illustrated in FIGS. 1–5 of these drawings comprises a sealed housing 12 which defines two fluid chambers 14 and 16. These chambers have been illustrated as being circular in shape for convenience. Insofar as the broad concept of the invention is concerned, the chambers need not be made in this circular shape, as will become readily apparent as the description proceeds.

Figure 1:
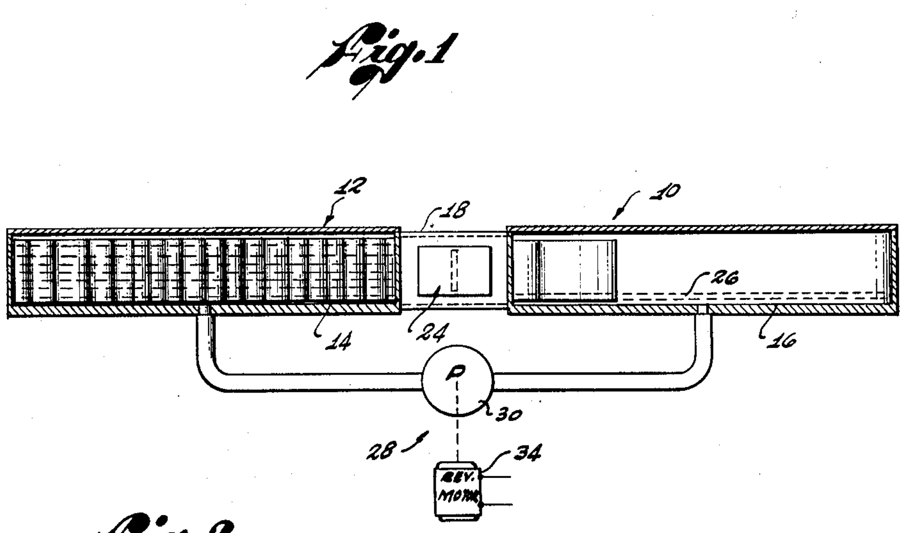
FIG. 1 is a section through a magnetic tape recorder and reproducer embodying the present hydraulic transport mechanism, the parts being shown in semidiagrammatic fashion.
Figures 2, 3, 4, 5:
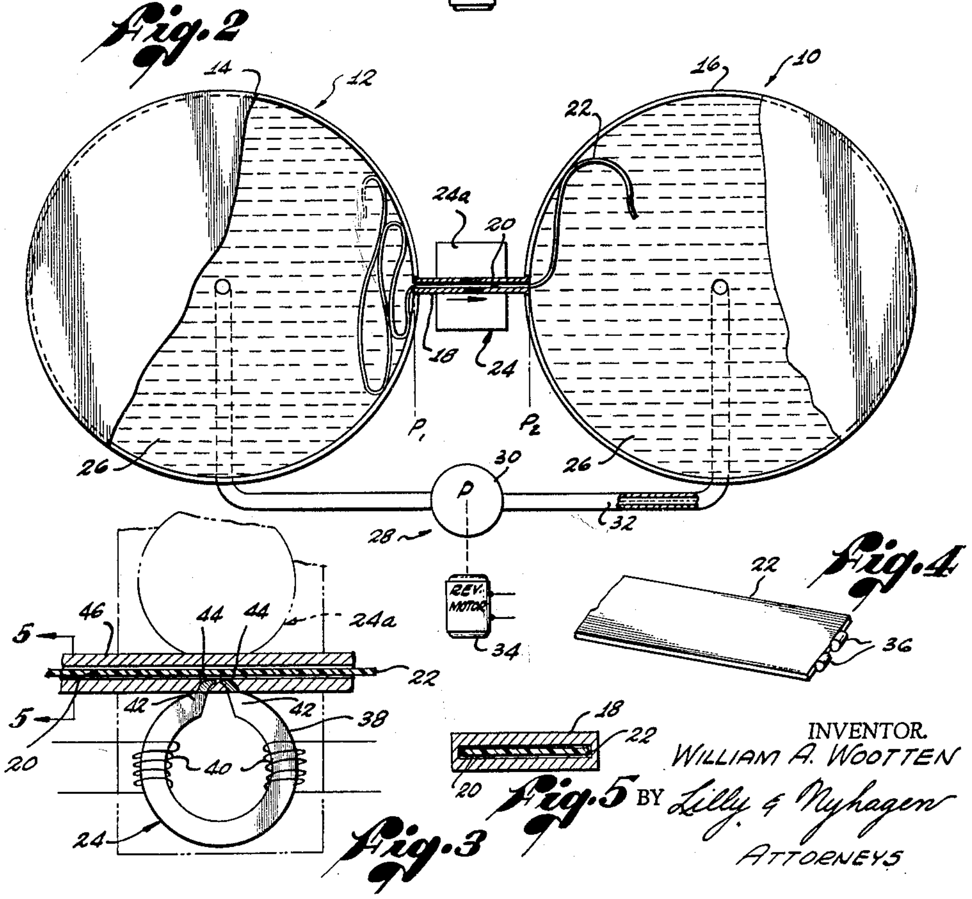
FIG. 2 is a side elevation of the recorder-reproducer in FIG. 1 with parts broken away for the sake of clarity.
FIG. 3 is an enlargement of the magnetic sound head of the recorder-reproducer.
FIG. 4 is an enlarged detail, in perspective, of one end of the magnetic recording tape used in the recorder-reproducer.
FIG. 5 is an enlarged section taken along line 5—5 in FIG. 3.

Chambers 14 and 16 are joined at a bridging part 18 of the housing. In this bridging part is an orifice or passage 20 which communicates chambers 14 and 16. Extending through passage 20 is the magnetic recording tape 22 to be fed past a magnetic sound head 24. Passage 20 is proportioned to receive the tape 22 with a close sliding fit, as shown in FIG. 5.

Within the fluid chambers 14 and 16 is a hydraulic fluid 26. Generally indicated at 28 is a means for selectively pumping hydraulic fluid from either chamber 14 or 16 to the other chamber. This means 28 comprises a reversible pump 30 connected in the line 32 communicating with the chambers. Pump 30 is driven by a reversible motor 34. It is evident, therefore, that when motor 34 is energized in one direction, hydraulic fluid is withdrawn from chamber 14 and delivered under pressure to chamber 16. When the motor is reversed, hydraulic fluid is withdrawn from chamber 16 and delivered under pressure to chamber 14. As will become evident as the description proceeds, there is actually very little flow of hydraulic fluid from one chamber to the other during operation of the pump. The pump serves primarily to create a pressure differential between the fluid chambers.

Let's assume that the pump 30 is operated to create a pressure differential between the chambers and that chamber 14 is the high pressure chamber. Under these conditions, the end of the magnetic recording tape 22 within the high pressure chamber 14 is subjected to the high fluid pressure in the chamber. The pressures acting on the two side surfaces of the tape, of course, balance out. The tape has but one transverse face exposed to the fluid pressure in the chamber, namely, the extreme end edge face of the tape. The longitudinal forces on the tape within chamber 14, however, balance out all along the tape from the transverse end face of the tape to the adjacent end of passage 20. The same is true of the end section of tape within the chamber 16. The fluid pressure in chamber 14 effectively acts on the tape in the plane $P_1$ of the adjacent end of the passage 20. Similarly, the fluid pressure in chamber 16 effectively acts on the tape in the plane $P_2$ of the end of the passage 20 adjacent chamber 16. It will be seen, therefore, that a pressure differential exists between the ends of the section of tape within the passage 20. This pressure differential develops a pressure force on the tape section which feeds the latter through the passage 20. As the tape moves through the passage 20, the fluid pressures in the chambers 14 and 16 continue to effectively act on the tape in the planes $P_1$ and $P_2$, respectively. Accordingly, the tape continues to feed through the passage 20 from the high pressure chamber 14 to the low pressure chamber 16.

When the pump 30 is operated to create a pressure differential between the chambers 14 and 16, therefore, the magnetic recording tape 22 is fed from the high pressure chamber to the low pressure chamber by hydraulic pressure. As the tape enters the low pressure chamber, it tends to form into a serpentine configuration illustrated in FIG. 2. This configuration permits a substantial length of tape to be contained in each chamber. In order to prevent the ends of magnetic recording tape 22 from passing completely through the passage 20, each end of the tape is provided with enlarged stop elements 36, shown in FIG. 4, which prevent each end of the tape from moving into the passage 20.

Various types of hydraulic liquids 26 may be employed in the transport mechanism. Oil, however, is conveniently used as a hydraulic fluid since it effectively lubricates the tape during its movement through the passage 20. Wear of the tape is, therefore, greatly minimized or eliminated.

As mentioned earlier, there is little flow of hydraulic fluid through the system during operation of the pump 30. This is evident from the fact that the magnetic tape 22 has a close fit in the passage 20 and the latter has a small cross-sectional area so that very little fluid can leak through the passage 20 from one chamber to the other. As a result, the pump 30 operates to create mainly a static pressure differential between the two chambers for causing movement of the tape through passage 20 from the high pressure chamber to the low pressure chamber.

The magnetic recording head 24 is used to either record an electrical signal on the magnetic tape or to reproduce a signal which has been previously recorded on the tape. As shown best in FIG. 3, the magnetic sound head 24 comprises a horseshoe magnet 38 having the usual coils 40. The poles 42 of the magnet are spaced a distance somewhat greater than those of a conventional sound head. These poles seat against two permeable pole piece inserts 44 in the housing wall 46 about the passage 20. The inserts 44 bear against the surface of the magnetic recording tape 22 within the passage and are spaced to provide the usual magnetic recording head air gap therebetween.

When magnetically recording on the tape 22, then, a current flows through the coils 40, which current fluctuates in accordance with the variations in the electrical signal impressed on the head. This creates a varying flux in the magnet 38, which flux is transmitted from the poles 42 of the magnet to the pole pieces 44 to create a varying flux across the air gap between the inserts. This varying flux is then recorded on the tape 22 as the latter feeds through the passage 20. During reproduction of a signal recorded on the tape, the magnetic sound head 24 generates a fluctuating electrical signal which varies in accordance with the variations in the recorded signal. If desired, the reverse side of the tape can be coated with magnetic oxide and recorded on by a separate sound head 24*a*.

One of the advantages of the present transport mechanism is its simplicity and lack of precision parts. Another advantage of the transport mechanism is that the magnetic recording tape 22 can be completely sealed in the transport housing 12 and the magnetic sound head 24 can be made as a separate component which is placed in its operative position shown during recording and reproduction. In this way, a simple cartridge-type tape recorder can be made in which the transport housing 12 with its pumping means 28 comprise a cartridge which can be placed on and removed from a simplified magnetic tape machine. This machine will have the magnetic sound head 24 and a means for energizing the pump motor in either direction so that the tape 22 can be fed in one direction through the passage 20 for recording or reproduction and in the opposite direction for rewind.

It is obvious that the present transport mechanism can be used to feed a magnetic recording wire rather than a magnetic recording tape as just mentioned. In the case of wire, of course, passage 20 will be round so as to receive the wire with a close sliding fit. The remainder of the magnetic wire recorder-reproducer is identical to that described earlier.

Figures 6, 7, 8:
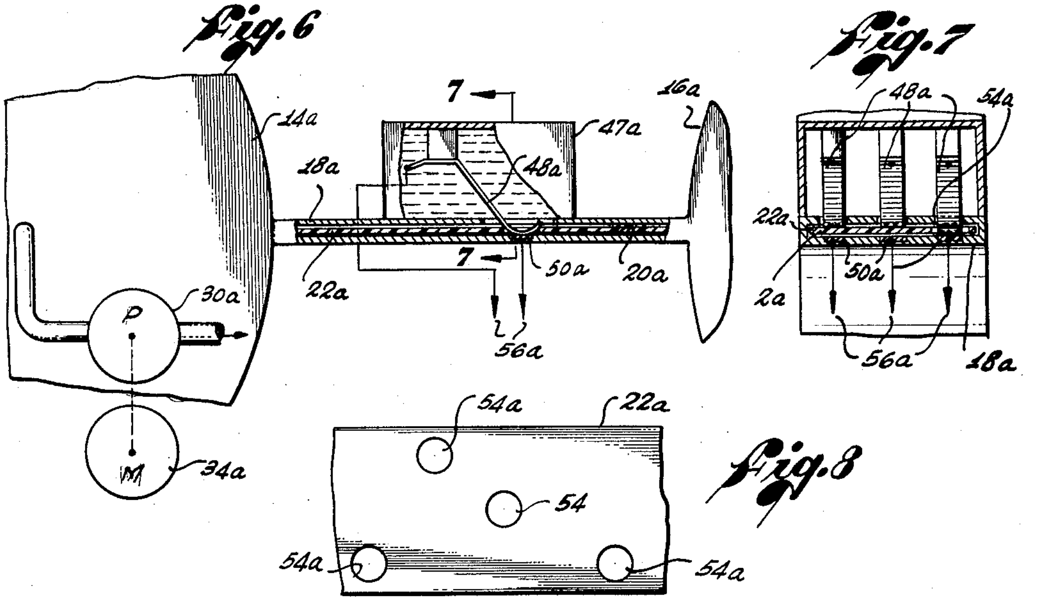
FIG. 6 is a side elevation, partially in section, of a portion of the hydraulically driven programing switch of the invention.
FIG. 7 is a section taken along line 7—7 in FIG. 6.
FIG. 8 is an enlarged view of a programing tape which is used in the switch of FIG. 6.

FIGS. 6–8 illustrate a programing switch embodying the present transport mechanism. In these figures, numeral 22*a* denotes a strip of electrical insulating material which is threaded through and has a close sliding fit in the passage 20*a* of the modified transport mechanism. Mounted on the connecting portion 18*a* of the housing, within an enclosure 47*a* which is sealed to the connection portion, are a plurality of electrical contact "brushes" 48*a* which bear against one side of the strip 22*a*. On the other side of strip 22*a*, within the passage 20*a*, are contacts 50*a*. Tape 22*a* has holes 54*a* in lengthwise rows aligned with the contact brushes 48*a*, respectively. When a tape hole is aligned with a particular brush contact, that brush touches the opposite contact 50*a* to complete an electrical circuit therebetween. The transport mechanism has terminals 56*a* electrically connected to the separate brush contacts 48*a* and contacts 50*a* for facility of connecting the programing switch in an external electrical circuit. Here, again, when the transport pump 30*a* is driven by its motor 34*a* to create a pressure differential between the transport chambers 14*a* and 16*a*, tape 22*a* is fed through the passage 20*a*. As the tape moves through the passage, it completes circuits from the individual brush contacts 48*a* to the contacts 50*a* in predetermined sequence to be uniquely adapted for use as an automatic programing switch for effecting preselected automatic operations of a machine (in respect to time). Motor 34*a*, like the earlier motor 34, is reversible so that tape 22*a* can be fed in either direction through passage 20*a*.

Figure 9:
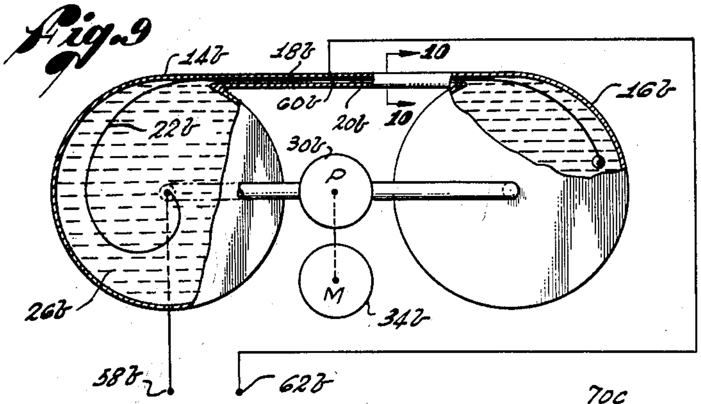
FIG. 9 is a view on reduced scale and in side elevation, with parts broken away, of the hydraulically driven variable electrical resistor of the invention.
Figure 10:
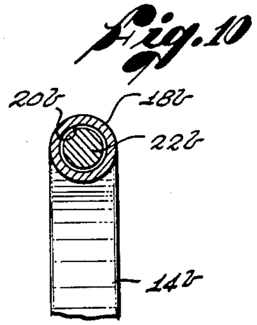
FIG. 10 is an enlarged section taken along line 10—10 in FIG. 9.

In FIGS. 9 and 10, there is illustrated a variable resistor device embodying the present transport mechanism. In this case, the flexible element 22*b* to be fed by the mechanism comprises a long resistance wire which has one end electrically connected to a terminal 58*b*. Mounted on the connecting portion 18*b* of the transport housing is a contact 60*b* which bears against the surface of the resistance wire 22*b*. This contact is electrically connected to a second terminal 62*b*.

During operation of this device, pump 30*b* of the transport mechanism is driven by its reversible motor **34*b* to create a pressure differential between the transport chambers 14*b* and 16*b*. The resistance wire is thereby fed in one direction or the other through the passage 20*b* and past the contact 60*b*. This movement of the wire changes the distance between the contact 60*b* and the end of the tape connected to the terminal 58*b* and, therefore, the electrical resistance between the two terminals 58*b* and 62*b* is varied. It is obvious that in this form of the invention, the hydraulic fluid 26*b*** used in the transport mechanism, as well as the other parts of the mechanism, must be electrically non-conductive.

Figures 11, 12:
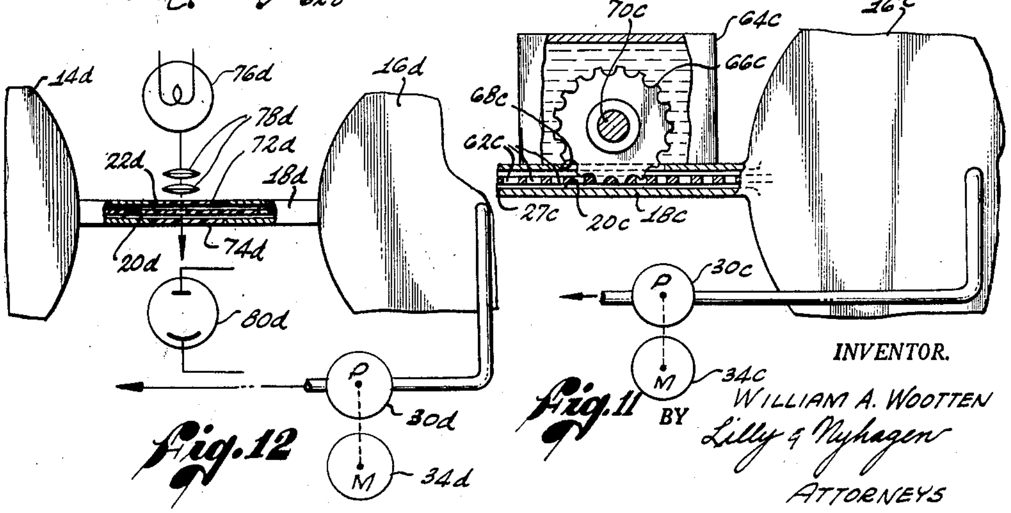
FIG. 11 is a side elevational view, partially in section, of a portion of the present hydraulically powered prime mover.
FIG. 12 is a side elevational view, partially in section, of a portion of the present photoelectric signal reproducer.

Reference is now made to FIG. 11 which illustrates the present transport mechanism used as a prime mover. In this form of the invention, the tape **22*c* which is fed by the mechanism is made of some high strength material, such as steel, and is formed with a lengthwise row of sprocket holes 62*c*. Rotatably mounted in a housing 64*c* sealed to the connecting portion 18*c* of the transport housing is a sprocket wheel 66*c*. The periphery of the sprocket wheel projects through a slot 68*c* in the connecting portion 18*c* of the transport housing into the passage 20*c* through the connecting portion and has its teeth disposed in meshing engagement with the sprocket holes 62*c*. The shaft 70*c* of the sprocket wheel 66*c* extends through and is sealed to a wall of the housing 64*c*** for connection to a member to be driven.

In operation, a pressure differential is created between the transport chambers **14*c*, 16*c* (not shown), by energizing of reversible motor 34*c* to drive the transport pump 30*c*, whereby to feed the tape 22*c* in one direction or the other through the passage 20*c*. This movement of the tape drives the sprocket wheel 66*c*** in rotation.

Reference is now made to FIG. 12 which illustrates the present transport mechanism used as a photoelectric signal reproducer. In this case, the connection portion **18*d* extending between the transport chambers 14*d* and 16*d* is provided with two transparent windows 72*d* and 74*d* at opposite sides of the passage 20*d***.

Here, the tape or strip **22*d* which is fed through the passage 20*d* comprises a photographic film on which is recorded a sound track, for example. At one side of the film 22*d*, in line with the window 72*d*, is a lamp 76*d* and lenses 78*d* for directing a light beam from the lamp 76*d* through window 72*d*, film 22*d* and window 74*d* to a photocell 80*d***.

During operation of this form of the invention, the film **22*d* is fed past the windows 72*d* and 74*d*, by creation of a pressure differential between the chambers 14*d* and 16*d* through operation of the transport pump 30*d* and its reversible motor 34*d*. During this movement of the film, the sound track passes through the light beam from the lamp 76*d* and varies the intensity of the light incident on the photocell 80*d***. The photoelectrically recorded signal on the film is thereby reproduced as an electrical signal output from the photocell.

In the various figures of the drawings, the clearance between the flexible strip or wire which is fed by the transport mechanism and the wall of the passage through which the strip or wire moves from one fluid chamber to the other has been exaggerated for clarity. Actually, the strip or wire has a close sliding fit in the passage, as described earlier. Further, while certain illustrative embodiments of the invention has been disclosed, these should be regarded as being purely illustrative rather than limiting in nature since the present transport mechanism is obviously capable of numerous other uses and applications. In some applications of the transport mechanism, the passage communicating the fluid chambers and through which the strip or wire is fed may be so short as to comprise, in effect, an orifice. The invention has been disclosed in connection with the use of hydraulic fluid as the propelling medium for the driven member of the transport mechanism since such a fluid is preferred. It is obvious, however, that any fluid may be used.

Clearly, then, the invention hereinbefore described and illustrated is fully capable of attaining the several objects and advantages preliminarily set forth. While certain illustrative embodiments of the invention have been described and illustrated, numerous modifications in the design, arrangement of parts, and instrumentalities of the invention ar obviously possible within the spirit and scope of the following claims.

What is claimed is:

1. A transport mechanism, comprising means defining two fluid chambers and a passage communicating said chambers, an elongate driven member extending through and having a length appreciably greater than the length of said passage, said member being of approximately uniform cross section along substantially its entire length and said passage being proportioned to receive said member with a close sliding fit, and means for creating a fluid pressure differential in either direction between said chambers, such that the fluid pressure in either chamber may be increased above the fluid pressure in the other chamber, whereby to cause movement of said member through said passage toward the low pressure chamber by the action of fluid pressure.

2. The subject matter of claim 1, wherein said chambers contain said fluid and said last-mentioned means comprises a pump for pumping said fluid from either chamber to the other chamber.

3. A transport mechanism, comprising means defining two fluid chambers and a passage communicating said chambers, a long, flexible driven member extending through and having a length appreciably greater than the length of said passage, said member being of approximately uniform cross section along substantially its entire length and said passage being proportioned to receive said member with a close sliding fit, and means for creating a fluid pressure differential in either direction between said chambers, such that the fluid pressure in either chamber may be increased above the fluid pressure in the other chamber, whereby to cause movement of said member through said passage toward the low pressure chamber under the action of fluid pressure, said driven member being adapted to bend as it enters either chamber, whereby each chamber accommodates a relatively long length of said member.

4. The subject matter of claim 3, wherein said member is a thin, flexible tape.

5. The subject matter of claim 3, wherein said member is a wire.

6. A fluid powered device, comprising a transport mechanism including means defining two fluid chambers and a passage communicating said chambers, a long, flexible driven member extending through and having a length appreciably greater than the length of said passage, said driven member being of approximately uniform cross section along substantially its entire length and said passage beig proportioned to receive said member with a close sliding fit, means for creating a fluid pressure differential in either direction between said chambers, such that the fluid pressure in either chamber may be increased above the fluid pressure in the other chamber, whereby to cause movement of said member through said passage toward the low pressure chamber under the action of fluid pressure, and means positioned adjacent said passage for coaction with said member.

7. A fluid-pressure-operated magnetic tape recorder, comprising a transport mechanism including means defining two fluid chambers and a passage communicating said chambers, a magnetic recording tape extending through and having a length appreciably greater than the length of said passage, said magnetic recording tape being approximately uniform in cross section along substantially its entire length and said passage being proportioned to receive said tape with a close sliding fit, means for creating a fluid pressure differential in either direction between said chambers, such that the fluid pressure in either chamber may be increased above the fluid pressure in the other chamber, whereby to cause movement of said tape through said passage toward the low pressure chamber under the action of fluid pressure, and a magnetic sound head mounted adjacent said passage in magnetic sound reproducing and recording relationship to said tape.

8. A fluid-pressure-operated magnetic wire recorder, comprising a transport mechanism including means defining two fluid chambers and a passage communicating said chambers, a magnetic recording wire extending through and having a length appreciably greater than the length of said passage, said magnetic recording wire being approximately uniform in cross section along substantially its entire length and said passage being proportioned to receive said wire with a close sliding fit, means for creating a fluid pressure differential in either direction between said chambers, such that the fluid pressure in either chamber may be increased above the fluid pressure in the other chamber, whereby to cause movement of said wire through said passage toward the low pressure chamber under the action of fluid pressure, and a magnetic sound head mounted adjacent said passage in magnetic sound reproducing and recording relationship to said wire.

9. A fluid-pressure-operated programing switch, comprising a transport mechanism including means defining two fluid chambers and a passage communicating said chambers, a tape extending through and having a length appreciably greater than the length of said passage, said tape being of approximately uniform cross section along substantially its entire length and said passage being proportioned to receive said tape with a close sliding fit, means for creating a fluid pressure differential in either direction between said chambers, such that the fluid pressure in either chamber may be increased above the fluid pressure in the other chamber, whereby to cause movement of said tape through said passage toward the low pressure chamber under the action of fluid pressure, electrical switch means mounted adjacent said passage in contact with said tape, and said tape having means to intermittently operate said switch means as the tape moves through the passage.

10. A fluid-pressure-operated variable resistor, comprising a transport mechanism including means defining two fluid chambers and a passage communicating said chambers, a long resistance wire extending through and having a length appreciably greater than the length of said passage, said wire being of approximately uniform cross section along substantially its entire length and said passage being proportioned to receive said wire with a close sliding fit, means for creating a fluid pressure differential in either direction between said chambers, such that the fluid pressure in either chamber may be increased above the fluid pressure in the other chamber, whereby to cause movement of said wire through said passage toward the low pressure chamber under the action of fluid pressure, an electrical terminal connected to said wire, an electrical contact mounted adjacent said passage and bearing against said wire, and a second electrical terminal connected to said contact.

11. A fluid-pressure-operated prime mover, comprising a transport mechanism including means defining two fluid chambers and a passage communicating said chambers, a long, flexible driven member extending through and having a length appreciably greater than the length of said passage, said member being of approximately uniform cross section along substantially its entire length and said passage being proportioned to receive said member with a close sliding fit, means for creating a fluid pressure differential in either direction between said chambers, such that the fluid pressure in either chamber may be increased above the fluid pressure in the other chamber, whereby to cause movement of said member through said passage toward the low pressure chamber under the action of fluid pressure, and a wheel rotatably mounted on said first-mentioned means and having its periphery projecting through the wall of said passage into peripheral driving engagement with said member, whereby said wheel is driven in rotation by movement of said member through said passage.

12. A fluid-pressure-operated photoelectric signal generator, comprising a transport mechanism including means defining two fluid chambers and a passage communicating said chambers, a film strip having a variable light density recording thereon extending through and having a length appreciably greater than the length of said passage, said strip being of approximately uniform cross section along substantially its entire length and said passage being proportioned to receive said strip with a close sliding fit, means for creating a fluid pressure differential in either direction between said chambers, such that the fluid pressure in either chamber may be increased above the fluid pressure in the other chamber, whereby to cause movement of said strip through said passage toward the low pressure chamber under the action of fluid pressure, the walls of said passage having transparent portions at opposite sides of said strip, means for directing a light beam through said transparent portions and strip, and a photoelectric cell to receive said light beam after passage through said strip.

13. A fluid-pressure-operated magnetic sound machine, comprising means defining two fluid chambers and a passage communicating said chambers, a long, flexible magnetic recording member extending through and having a length appreciably greater than the length of said passage, said member being of approximately uniform cross section along substantially its entire length and said passage being proportioned to receive said member with a close sliding fit, means for creating a fluid pressure differential in either direction between said chambers, such that the fluid pressure in either chamber may be increased above the fluid pressure in the other chamber, whereby to cause movement of said member through said passage toward the low pressure chamber under the action of fluid pressure, a pair of magnetic pole pieces embedded in the wall of said passage and defining a narrow air gap therebetween disposed in magnetic sound reproducing and recording relationship to said magnetic member, and a magnetic sound head on the outside of and separable from said first-mentioned means arranged with its poles in removable contact with said pole pieces, respectively.

14. The subject matter of claim 13, wherein said member is a magnetic recording tape.

15. The subject matter of claim 13, wherein said member is a magnetic recording wire.

16. The method of reversibly longitudinally feeding a long, flexible member having a relatively uniform cross section along its entire length, comprising the steps of threading said member through a passage in which said member has a close sliding fit, and selectively exposing either end of said passage to a given fluid pressure and the other end of said passage to a lesser fluid pressure, whereby to cause longitudinal movement of said member toward said other passage end.

17. The subject matter of claim 1, wherein said fluid is hydraulic fluid.

18. The subject matter of claim 1, wherein said fluid is an oil capable of lubricating said member to reduce the frictional resistance to movement of the member through said passage.

References Cited in the file of this patent

UNITED STATES PATENTS 2,854,059 Palmer ---------------- Sept. 30, 1958

FOREIGN PATENTS 858,154 Great Britain ---------- Jan. 11, 1961